United States Patent
Tamura

(10) Patent No.: US 7,503,666 B2
(45) Date of Patent: Mar. 17, 2009

(54) LIGHTING DEVICE

(75) Inventor: Kinya Tamura, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 10 days.

(21) Appl. No.: 11/730,430

(22) Filed: Apr. 2, 2007

(65) Prior Publication Data

US 2007/0236909 A1 Oct. 11, 2007

(30) Foreign Application Priority Data

Apr. 5, 2006 (JP) .............................. 2006-104219

(51) Int. Cl.
*G01D 11/28* (2006.01)
(52) U.S. Cl. .................... 362/26; 362/489; 362/511; 116/287; 385/901
(58) Field of Classification Search .................. 362/26, 362/27, 489, 511, 559, 561, 628; 116/287, 116/DIG. 36; 385/146, 901
See application file for complete search history.

(56) References Cited

U.S. PATENT DOCUMENTS 5,949,346 A * 9/1999 Suzuki et al. ................. 362/26
6,302,551 B1 * 10/2001 Matumoto ................... 362/27
2002/0101551 A1 8/2002 Akaoka
2006/0193144 A1 8/2006 Braeutigam et al.

FOREIGN PATENT DOCUMENTS

| DE | 198 50 443 A1 | 4/2003 |
|---|---|---|
| EP | 0 940 625 A2 | 9/1999 |
| EP | 1 657 111 A2 | 5/2006 |
| FR | 2 536 504 | 5/1984 |
| JP | 2003-130693 A | 5/2003 |

* cited by examiner

*Primary Examiner*—Stephen F Husar
(74) *Attorney, Agent, or Firm*—Foley & Lardner LLP

(57) ABSTRACT

A lighting device, for illuminating display designed parts on a display plate arranged parts at-least-partially around a center axis, includes a light source for emitting light and arranged at a rear side of the display plate, and a light guide body having at least one light guide portion including an inner portion and an outer portion. The inner portion has a rear side surface for receiving the light from the light source and a front side surface with a curvature for reflecting the light to change a forward-backward direction of the flight inputted from the light source toward an outwardly radial direction to guide the light so that the light can travel in the outer portion in approximately radial directions centered on the center axis and be suppressed from diffusion from a central line passing through though the center axis and the light source.

10 Claims, 6 Drawing Sheets

PRIOR ART

LIGHTING DEVICE

BACKGROUND OF THE INVENTION

1. Field of the Invention

The present invention relates to a lighting device that is capable of guiding light outputted from a light source toward an object to be irradiated, such as an indicator of an instrument panel for a motor vehicle.

2. Description of the Related Art

A conventional lighting device of this kind is disclosed in Japanese patent laid-open publication No. 2003-130693. This conventional lighting device is used for illuminating an indicator of an instrument panel mounted on a motor vehicle for example, and is equipped with a light source for emitting light and a light guide body for guiding the light toward an indicator needle and an indicator plate with display designed parts, such as scale marks and characters, arranged around a center axis of the indicator needle for indicating a vehicle speed, an engine speed, a fuel remaining amount and others. The light source is arranged in the vicinity of a spindle of the indicator needle, and the light guide body is arranged between the indicator plate and the light source to receive and guide its light. The light body is made of transparent material and is formed with a first partially-conic surface for reflecting the light introduced from the light source in an outer radial direction and a second partially-conic surface, which is arranged outwardly in a radial direction and provided with crimps and the like, for reflecting and guiding the light reflected on the first partially-conic surface toward the indicator needle and the display plate so as to illuminate them.

Another conventional lighting device used for an instrument panel of a motor vehicle is known, and is illustrated in FIGS. 7A and 7B. This device includes a light source 7 and a light guide body consisting of a plurality of body portions 800. The body portions 800 are made of translucent material, each having an inner portion 800a and an outer portion 800b extending radially from the inner portion 800a, and are arranged to be in a partially-circular shape centered on a spindle 5 of a not-shown indicator needle. An inner-circumferential side surface 801 of the inner portion 800a and an outer-circumferential side surface 802 of the outer portion 800b are formed to have curved side surfaces, which are centered on a center axis 5a of the spindle 5. Specifically, the inner-circumferential side surface 801 of the inner portion 800a is shaped in concave when it is seen from a front side of the instrument panel. The inner portion 800a is thicker than the outer portion 800b and vertically bent so that its bottom surface can receive light outputted from the light source 7 and its upper curved surface can reflect light and change a vertical direction thereof toward a radially-outward direction. The outer portion 800b is slanted gradually in an upward direction, approaching eyes of a user, and becomes thinner from its inner portion toward its outer portion. Incidentally, display designed parts are arranged around the center axis 5a, but they are omitted in FIGS. 7A and 7b.

The both conventional lighting devices, however, encounter a problem in that illumination efficiency and brightness of the display designed parts are decreased because of light deviating therefrom, consequently deteriorating visibility of the indicator and the display designed parts.

In the latter conventional lighting device, the light entered the light guide body is reflected by the inner portion 800b having the concave inner-circumferential side surface 801 centered on the center axis 5a of the spindle 5 as shown in FIG. 7A and the upper curved surface sharply bent in vertical cross-section as shown in FIG. 7B. The entered light is widely diffused by reflecting on these surfaces from a central line L passing through the center axis 5a and the light source 7, because much part of the reflected light travels deviating from radial directions centered on the center axis 5a. The light, traveling in the outer portion 800b toward the outer-circumferential side surface 802, is reflected on both side surfaces thereof in various directions, and accordingly some of the light deviates from the display designed parts. The light reflected by a rear surface of the outer portion 800b is diffused in various directions so that an amount of the light going to eyes of a user is decreased, because the light which deviates from the radial directions to hit the rear surface is hard to reach the eyes of the user. This causes decrease in its efficiency of illuminating the display designed parts and the indicator.

In the former conventional lighting device, the light travels similarly to the latter conventional lighting device, which also causes the decrease in its illumination efficiency.

It is, therefore, an object of the present invention to provide a lighting device which overcomes the foregoing drawbacks and can increase an illuminating efficiency to improve visibility of the display designed parts to be illuminated.

SUMMARY OF THE INVENTION

According to a first aspect of the present invention there is provided a lighting device that is capable of illuminating display designed parts provided on a display plate and arranged at-least-partially around a center axis. The lighting device includes at least one light source which is capable of emitting light and is arranged at a rear side of the display plate, and a light guide body having at least one light guide portion including an inner portion and an outer portion, the inner portion having a rear side surface for receiving the light from the light source facing the rear side surface and a front side surface with a curvature that is formed like a convex, when the front side surface is seen from a front side of the display, having a cross section where both end portions of the front side surface are curved to be thinner than an intermediate portion thereof along a circumferential directional plane thereof, the curvature being further formed like a convex in a cross-section along a plane passing through the center axis, for reflecting the light inputted through the rear side surface to change a direction of the light from a forward-backward direction toward an outwardly radial direction and guide the light so that the light can travel in the outer portion in approximately radial directions centered on the center axis and be suppressed from being diffused from a central line passing through though the center axis and the light source.

Therefore, the lighting device can increase an illumination efficiency due to the light traveling in the approximately radial directions to improve visibility of the display designed part to be illuminated, because the front side surface of the inner portion can suppress the diffusion of the light.

Preferably, the light guide portion is formed like a sector, the inner portion being thicker than the outer portion and being bent rearward so that a thickness-side surface thereof forms the rear side surface and the front side surface forms like a convex in a cross-section along a plane passing through the center axis, the inner portion having a cross-section where both end portions thereof are curved to be thinner than an intermediate portion thereof along a circumferential directional plane. The outer portion is extended in an outwardly radial direction under the display designed parts, the outer portion having a cross-section where both end portions thereof are curved to be thinner than an intermediate portion thereof along the circumferential directional plane.

Therefore, using a plurality of the light guide portions according to the display designed parts can be adopted for more kinds of display devices, more kinds of the display designed parts, and the like.

Preferably, the light guide portion is provided on a rear surface of the outer portion with a plurality of reflecting surfaces which are arranged co-axially to reflect the light passing in the outer portion in a front direction toward the display designed parts.

Therefore, the reflecting surfaces can cast the light on the display designed parts, thereby improving the brightness.

Preferably, the lighting device is arranged in an instrument panel of a motor vehicle, the center axis being an axis of an indicator needle, and the display designed parts including at least one of characters and scale marks.

Therefore, the lighting device can increase the utility of the instrument panel of the motor vehicle.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
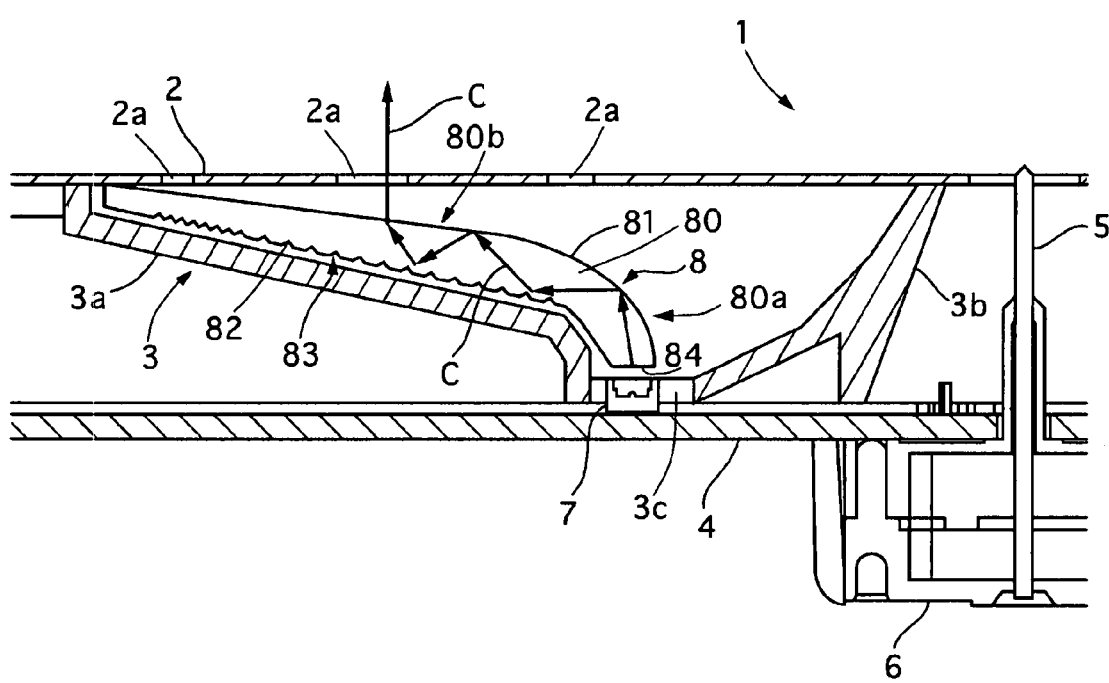
FIG. 1 is a fragmentary cross-sectional side view showing an instrument panel of a motor vehicle with a lighting device of a first embodiment according to the present invention.

Throughout the following detailed description, similar reference characters and numbers refer to similar elements in all figures of the drawings, and their descriptions are omitted for eliminating duplication.

Referring to FIG. 1 of the drawing, there is shown an instrument panel 1, adapted for a motor vehicle, with a lighting device of a preferred embodiment according to the present invention. Note that FIG. 1 shows a cross section of a half part of the lighting device.

The instrument panel 1 is provided with a speed meter, a tachometer (an engine speed meter), a fuel meter and the like, whose indicator needles and display designed parts 2a, including scale marks and characters, are illuminated for increasing visibility thereof. It includes a display plate 2 with the display designed parts 2a, a reflecting wall part 3, a base plate 4, an indicator spindle 5, a spindle drive pat 6, a plurality of light sources 7 and a light guide body 8.

The display panel 2 is made of transparent material or translucent material. It is provided on its front surface with the display designed parts 2a and background parts excluding the display designed parts 2a. The display designed parts 2a have the characters and the scale marks, which are at-least partially arranged around the indicator needle 5. Their portions corresponding to the characters and the scale marks are transparent or translucent, and their portions corresponding to the background parts are non-transparent. For example, the background parts may be printed in black, and the display designed parts 2a may be printed in other colors as long as they can pass the light.

The reflecting wall part 3 is formed at its outer side to have an outer portion 3a with a partially-circular conical surface, which is centered on an center axis 5a of the indicator spindle 5 and is gradually slanted to extend outwardly-radially from a base plate 4 side toward the display plate 2 side, for reflecting lights outputted from the light sources 7 toward the display plate 2. The reflecting wall part 3 is also formed at its inner side to have an inner portion 3b with a partially-circular conical surface, which is centered on the center axis 5a and is slanted to extend inwardly-radially from the base plate 4 toward the display plate 2. A top end portion of the inner portion 3b partially surrounds and is radially spaced from the indicator spindle 5. The outer portion 3a and the inner portion 3b are integrally connected by a bottom portion 3c, which is formed with a plurality of holes to receive the light sources 7, respectively.

The base plate 4 is placed rearward away from a rear surface of the display plate 2, being arranged in parallel thereto. The base plate 4 is provided thereon with the light sources 7, their not-shown drive circuit, the spindle drive part 6 and its not-shown electric circuit.

The indicator spindle 5 is mounted on its top portion with a not-shown indicator needle, which extends from the top portion of the spindle 5 in parallel to the display plate 2 over a front surface thereof so that it can be rotated by the spindle drive part 6 to indicate a vehicle speed or an engine speed for example. The indicator needle is made of transparent material or translucent material so as to pass and guide the light from the light source 7 and cast it toward eyes of a user through an entire front surface thereof.

The light sources 7 employ light emitting diodes (LEDs) in this embodiment, which is preferable because of lower manufacturing costs due to easy assembly and direct mount on the base plate 4, although they may use other sources of light. They are arranged on a circumference of the center axis 5a, being evenly spaced apart.

The light guide body 8 includes a plurality of light guide portions 80, each of which is formed like a sector centered on the center axis 5a. They are arranged around the center axis 5a, and the number thereof is set depending on a circumference length of the display designed parts 2a, although three light guide portions 80 are illustrated in FIGS. 2 to 6 for the sake of simplicity. For example, six to seven light guide portions are used for the vehicle speed meter and the tachometer, and three light guide portions are used for the fuel amount meter. One light source 7 is used for one light guide portion 80.

Figure 4:
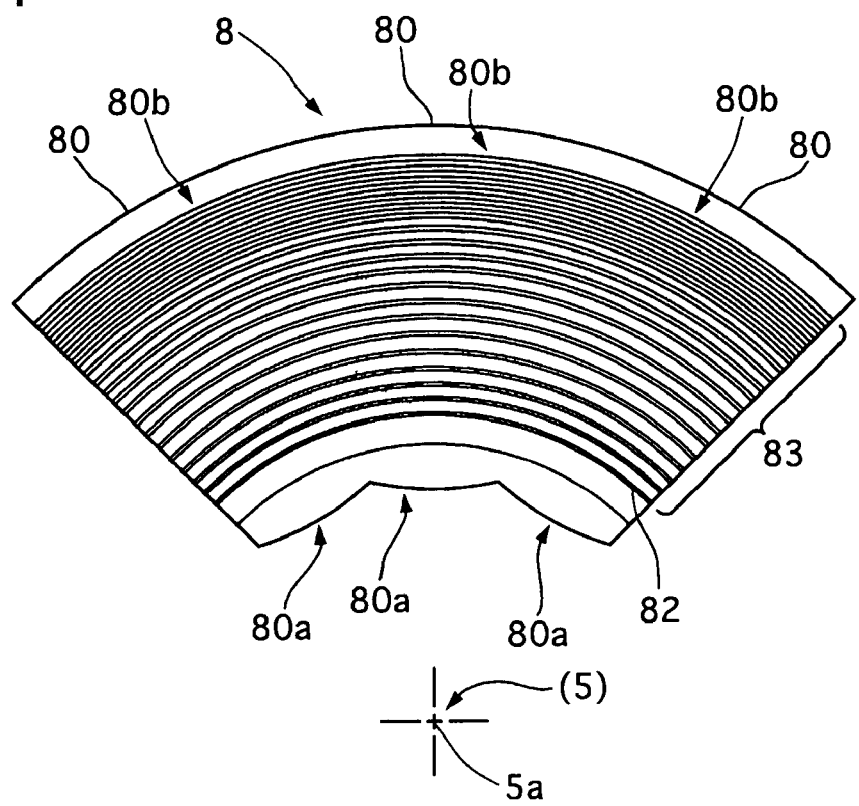
FIG. 4 is a rear view showing three light guide portions shown in FIGS. 2 and 3.
Figure 5A:
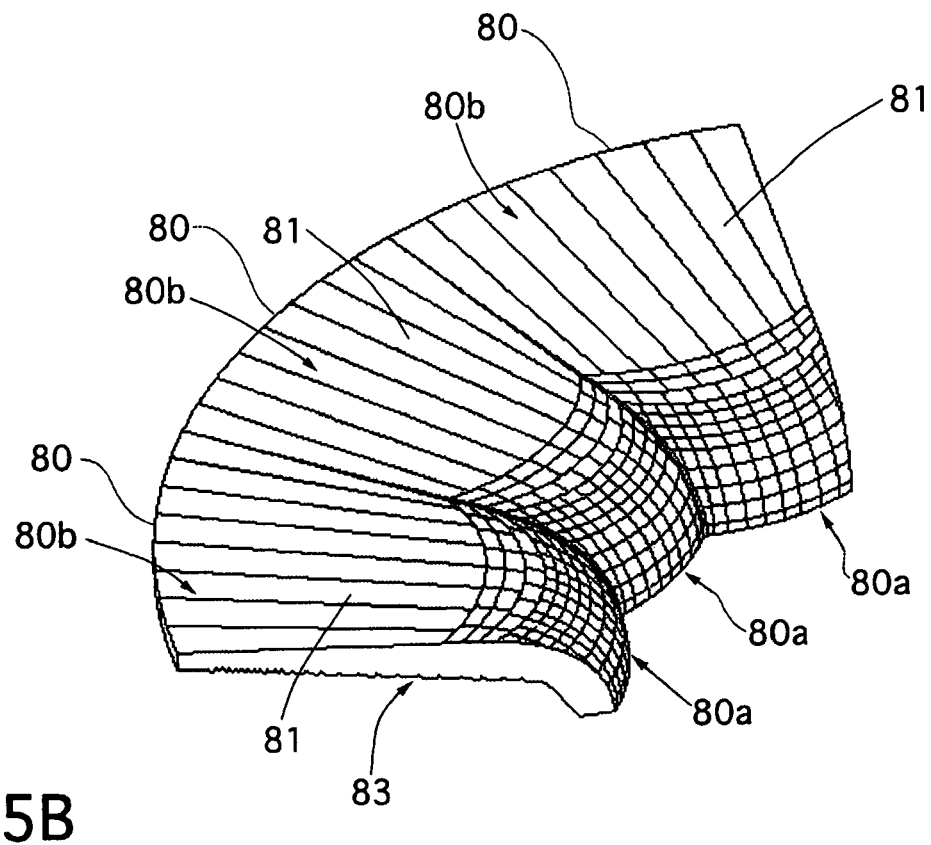
FIG. 5A is a perspective view showing the three light guide body portions indicated by using finite element meshes.
Figure 5B:
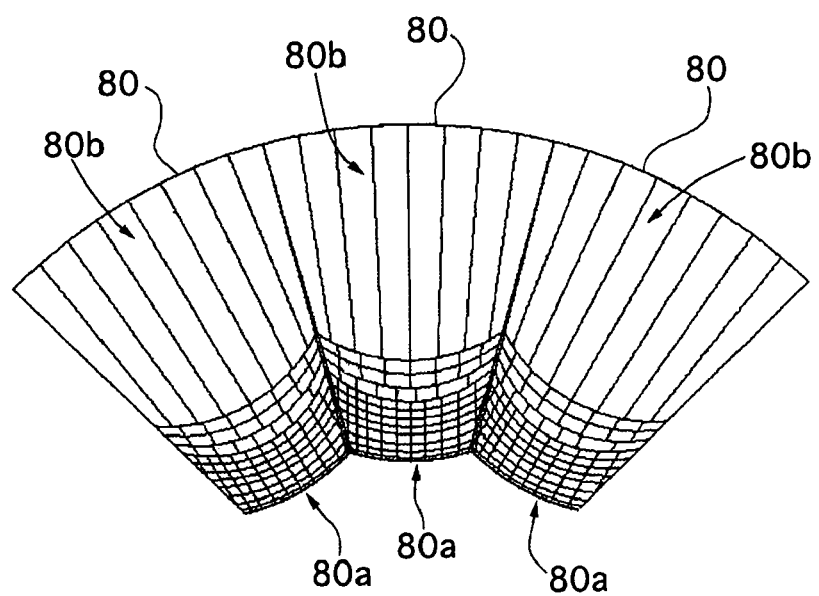
FIG. 5B is a front view showing the same also by using the finite element meshes.

As shown in FIGS. 2 to 5B, the light guide portion 80 has an inner portion 80a and an outer portion 80b of which surfaces have configurations formed as follows. Incidentally, FIGS. 5A and 5B show their surface configurations illustrated by using finite element meshes for easily understanding.

Figure 6A:
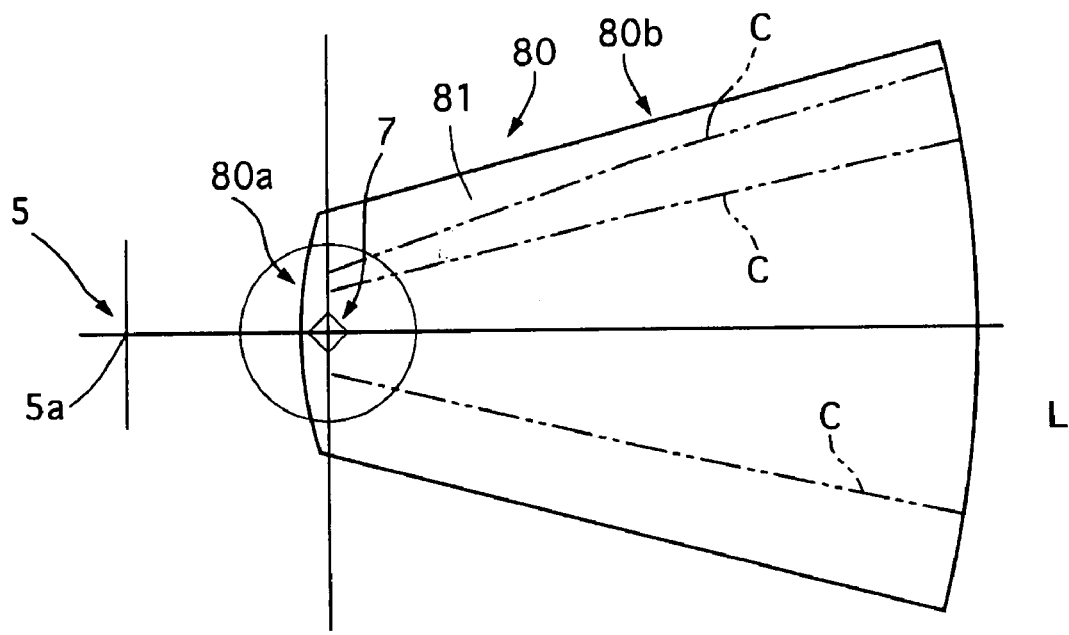
FIG. 6A is a front view of the light guide portion in which some light paths are illustrated.
Figure 6B:
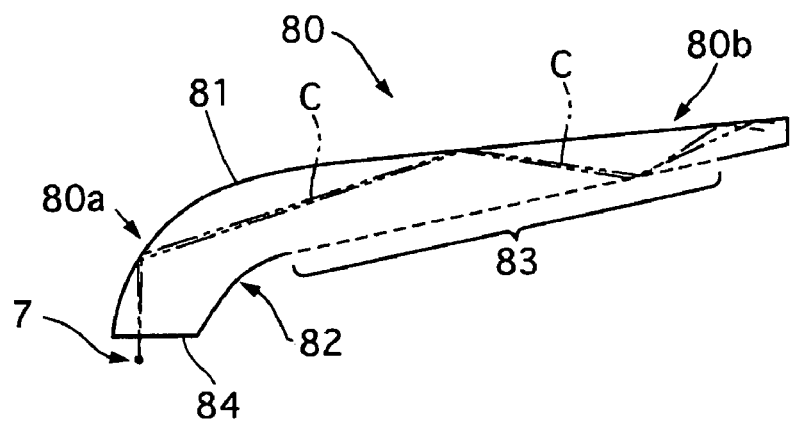
FIG. 6B is a side view of the same with the light paths.

The inner portion 80a is formed thicker than the outer portion and is bent rearward, so that a rear side surface 84 is formed by a thickness-side surface, namely a side surface, thereof, being flat to face the light source 7 and receive the light therefrom. As shown in FIGS. 6A and 6B, a front side surface 81 is formed to have a curvature for reflecting the light inputted through the rear side surface 84 to change a forward-backward direction of the light toward an outwardly radial direction and guide the light so that the light can travel through the outer portion 80b, approaching in radial directions centered on the center axis 5a as much as possible and also being suppressed from its diffusion from a central line L passing through though the center axis 5a and the light source 7 as much as possible. Specifically, the inner portion 80a is formed to have a cross-section where both end portions thereof are curved to be thinner than its intermediate portion along a circumferential directional plane, and the front side surface 81 of the inner portion 80a is formed like a convex shape in a cross-section along a plane passing through the center axis 5a.

The outer portion 80b is formed to increase its width in a circumferential direction with its radial directional length. It is slanted to extend outwardly-radially from the inner portion 80a toward the display plate 2, and has a cross-section where both end portions thereof are curved to be thinner than an intermediate portion thereof along the circumferential directional plane.

Accordingly, the front side surface 81 sharply rises from the rear side surface 84 and then is curved to extend in the outwardly radial direction, slightly toward the front side of the outer portion 80b.

Figure 2:
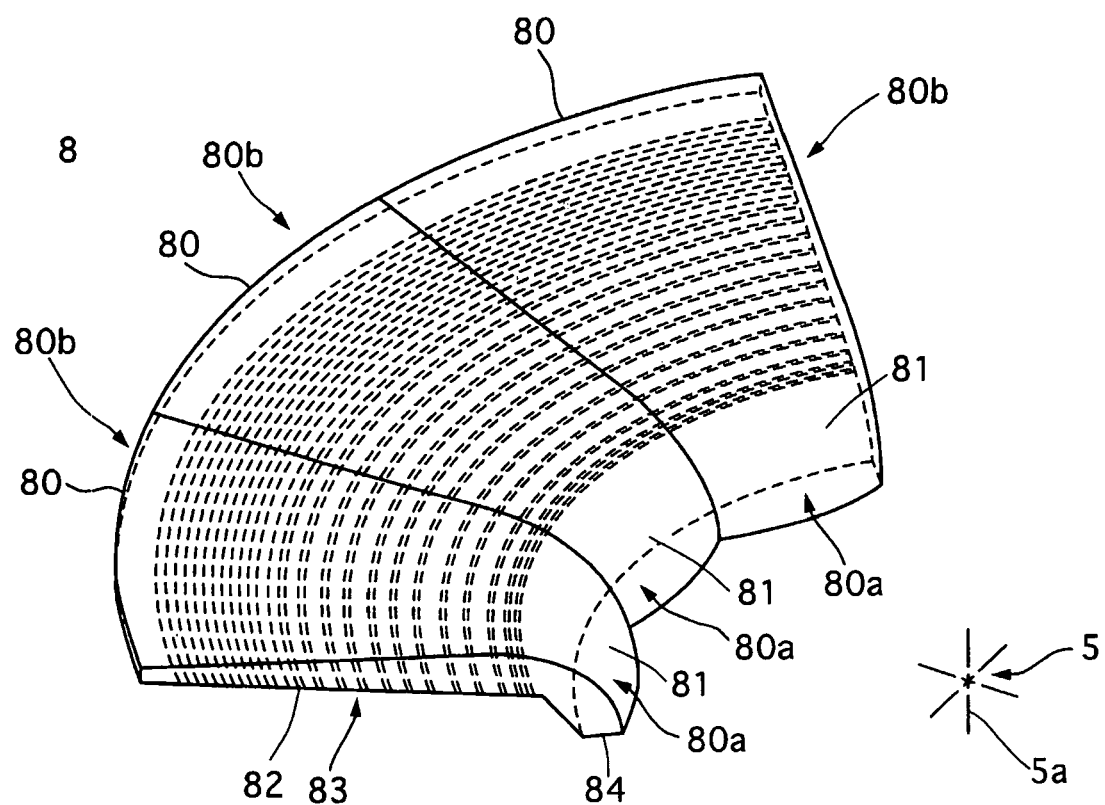
FIG. 2 is a perspective view showing three light guide body portions which are used in the lighting device of the first embodiment.
Figure 3:
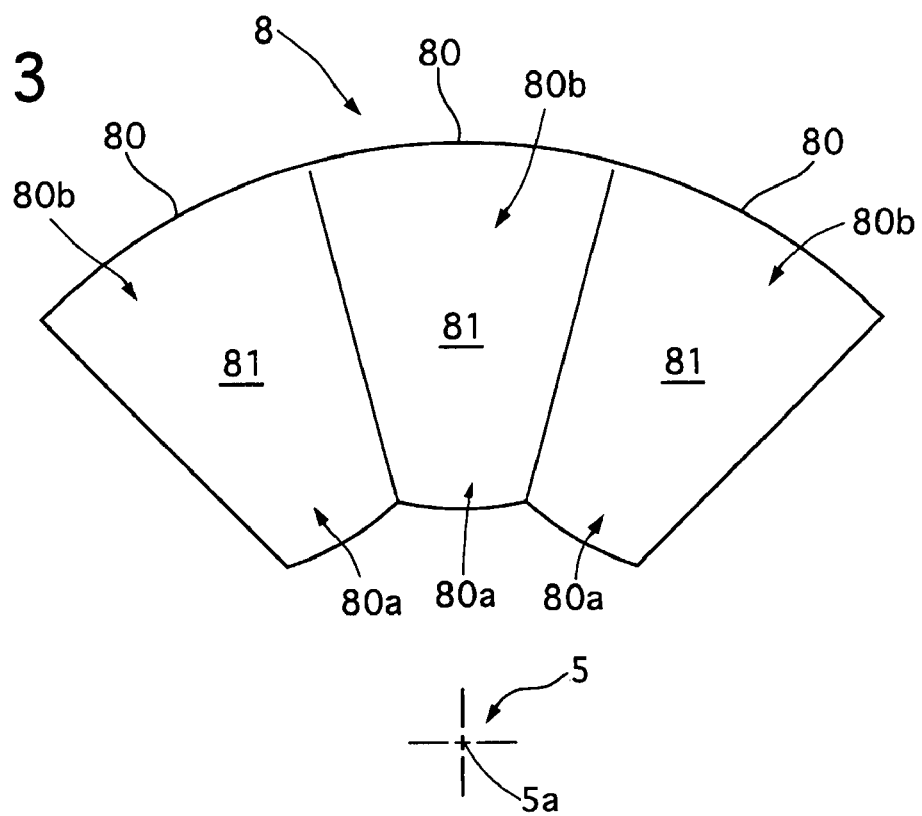
FIG. 3 is a front view of the three light guide body portions shown in FIG. 2.

The outer portion 80b is also formed on its rear surface 82 with reflecting parts 83 including a plurality of crimps arranged coaxially with the center axis 5a as shown in FIGS. 2 and 4. Reflecting angles of the reflecting parts 83 are set so that they can reflect the light traveling in the outer portion 80b toward the front direction so as to illuminate the display designed parts 2a. The number of the crimps and configurations of the crimps of the reflecting parts 83 are designed according to positions and illumination-brightness of the display designed parts 2a so that they can guide the light in the outwardly radial direction and in the frontward direction at appropriate rates. The surfaces forming the reflecting parts 83 correspond to reflecting surfaces of the present invention.

The operation of the lighting device of the embodiment will be described with reference to the accompanying drawings.

As shown in FIG. 1, when the light sources 7 are turned on, they emit the light. Most of the emitted light enters the rear side surface 84 of the inner portion 80a to go frontward and then is reflected in the outwardly radial direction on the front side surface 81 of the inner portion 80a.

Some of this reflected light repeats reflection between the rear surface 82 and the front side surface 81 of the outer portion 80b, so that the light goes outwardly-radially in the outer portion 80b and reaches the outer peripheral portion of the outer portion to illuminate the display designed parts 2a arranged near the outer peripheral portion. This is useful especially for a speed meter, a fuel meter and others, since the display designed parts 2a like characters and/or scale marks are arranged at an outer peripheral portion of a meter.

In addition, some of the reflected light goes in the outer portion 80b in approximately radial directions and hits the reflecting parts 83 formed on the rear surface 82. The light is reflected frontward and hits the reflecting parts 83 in perpendicular to crimps, thereof so that much thereof reaches the eyes of the user, because the light goes in the approximately radial directions. Therefore, the characters and the scale marks of the display designed parts 2a, especially when they are arranged at the front side of the outer portion 80b, are displayed in higher brightness and with higher efficiency, and can be seen brightly and clearly by the user.

On the other hand, some of this emitted light is reflected and diffused by the front surfaces of the reflecting wall part 3 and by white painted parts formed on the rear surface of the display plate 2, thereby enlarging an illuminated area.

Therefore, in this embodiment, the light passing through the display designed parts 2a goes frontward, which enables the characters and the scale marks to be seen more brightly and clearly by the user because eyes of his or her are at front of the instrument panel. This improves the efficiency of the illumination.

Figure 7A:
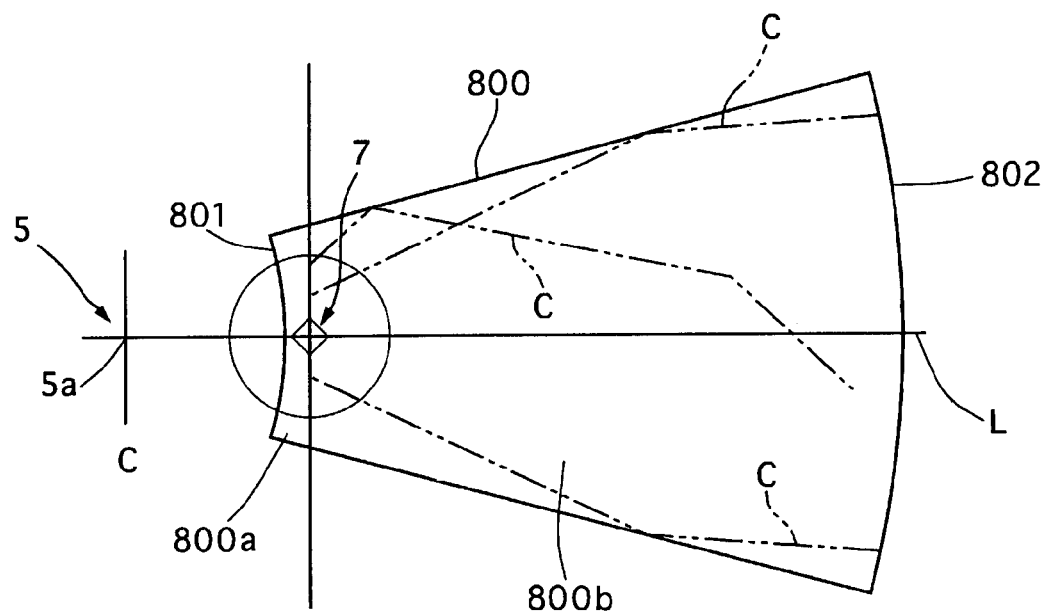
FIG. 7A is a front view of a conventional light guide portion in which some light paths are illustrated.
Figure 7B:
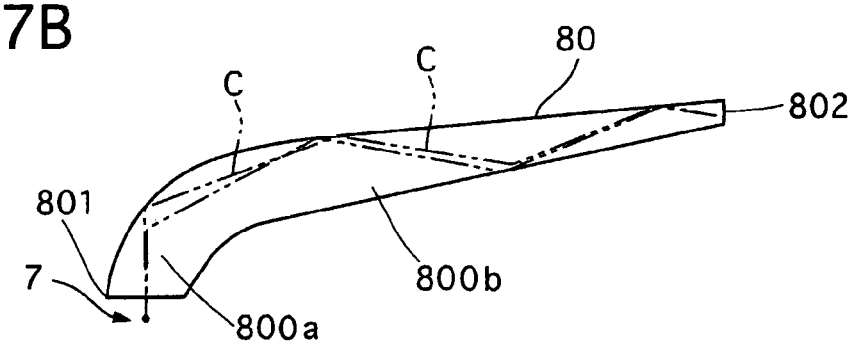
FIG. 7B is a side view of the same with the light paths.

FIGS. 6A and 6B show some of light paths C where the light obtainable by the embodiment travels in the light guide portion 80. The light goes outwardly in the approximately radial directions centered on the center axis 5a, which enables the reflected light on the reflecting parts 83 to mostly head for the eyes of the user, increasing the brightness of the display designed parts 2a, especially arranged over the outer portion 80b, to improve its visibility. In addition, it enables the light to pass through the outer portion 80b toward its outer peripheral portion and illuminate the display designed parts 2a, especially arranged near the outer peripheral portion. Furthermore, the light in the outer portion 80b is suppressed from being diffused from a central line L which passes through the center axis 5a of the indicator spindle 5 and the light source 7, relative to the light paths of the light guide body of the prior art shown in FIGS. 7A and 7B. This suppression of the diffusion of the light is mostly due to the convex-like shaped surface of the inner portion 80a and can decrease a loss of illumination.

While there have been particularly shown and described with reference to preferred embodiments thereof, it will be understood that various modifications may be made therein, and it is intended to cover in the appended claims all such modifications as fall within the true spirit and scope of the invention.

The light device is used for the instrument panel of the motor vehicle in this embodiment, and may be used for other devices which need illumination.

The display designed parts 2a may be arranged to entirely surround the center axis 5a of the indicator spindle 5.

The entire contents of Japanese Patent Application No. 2006-104219 filed Apr. 5, 2006 are incorporated herein by reference.

What is claimed is:

1. A lighting device that is capable of illuminating display designed parts provided on a display plate and arranged at-least-partially around a center axis, the lighting device comprising:

at least one light source which is capable of emitting light and is arranged at a rear side of the display plate; and a light guide body having at least one light guide portion including an inner portion and an outer portion, the inner portion having a rear side surface for receiving the light from the light source facing the rear side surface and a front side surface with a curvature that is formed like a convex, when the front side surface is seen from a front side of the display, having a cross section where both end portions of the front side surface are curved to be thinner than an intermediate portion thereof along a circumferential directional plane thereof, the curvature being further formed like a convex in a cross-section along a plane passing through the center axis, for reflecting the light inputted through the rear side surface to change a direction of the light from a forward-backward direction toward an outwardly radial direction and guide the light so that the light can travel in the outer portion in approximately radial directions centered on the center axis and be suppressed from being diffused from a central line passing through though the center axis and the light source.

2. The lighting device according: to claim 1, wherein the light guide portion is formed like a sector, the inner portion being thicker than the outer portion and being bent rearward so that a thickness-side surface thereof forms the rear side surface, the inner portion having a cross-section where both end portions thereof are curved to be thinner than an intermediate portion thereof along a circumferential directional plane, wherein the outer portion is extended in an outwardly radial direction under the display designed parts, the outer portion having a cross-section where both end portions thereof are curved to be thinner than an intermediate portion thereof along the circumferential directional plane.

3. The lighting device according to claim 2, wherein the light guide portion is provided on a rear surface of the outer portion with a plurality of reflecting surfaces which are arranged co-axially to reflect the light passing in the outer portion in a front direction toward the display designed parts.

4. The lighting device according to claim 3, wherein the lighting device is arranged in an instrument panel of a motor vehicle, the center axis being an axis of an indicator needle, and the display designed parts including at least one of characters and scale marks.

5. The lighting device according to claim 1, wherein the light guide portion is formed like a sector, the inner portion being thicker than the outer portion and being bent rearward so that a thickness-side surface thereof forms the rear side surface, the inner portion having a cross-section where both end portions thereof are curved to be thinner than an intermediate portion thereof along a circumferential directional plane, wherein the outer portion is extended in an outwardly radial direction under the display designed parts, the outer portion having a cross-section where both end portions thereof are curved to be thinner than an intermediate portion thereof along the circumferential directional plane.

6. The lighting device according to claim 5, wherein the light guide portion is on a rear surface of the outer portion provided with a plurality of reflecting surfaces which are arranged co-axially to reflect the light passing in the outer portion in a front direction toward the display designed parts.

7. The lighting device according to claim 6, wherein the lighting device is arranged in an instrument panel of a motor vehicle, the center axis being an axis of an indicator needle, and the display designed parts including at least one of characters and scale marks.

8. The lighting device according to claim 1, wherein the light guide portion is provided on a rear surface of the outer portion with a plurality of reflecting surfaces which are arranged co-axially to reflect the light passing in the outer portion in a front direction toward the display designed parts.

9. The lighting device according to claim 8, wherein the lighting device is arranged in an instrument panel of a motor vehicle, the center axis being an axis of an indicator needle, and the display designed parts including at least one of characters and scale marks.

10. The lighting device according to claim 1, wherein the lighting device is arranged in an instrument panel of a motor vehicle, the center axis being an axis of an indicator needle, and the display designed parts including at least one of characters and scale marks.

* * * * *